March 31, 1925.
A. WOOD ET AL
1,531,327
PNEUMATIC CHUCK FOR BORING MACHINES
Filed April 18, 1922 3 Sheets-Sheet 1
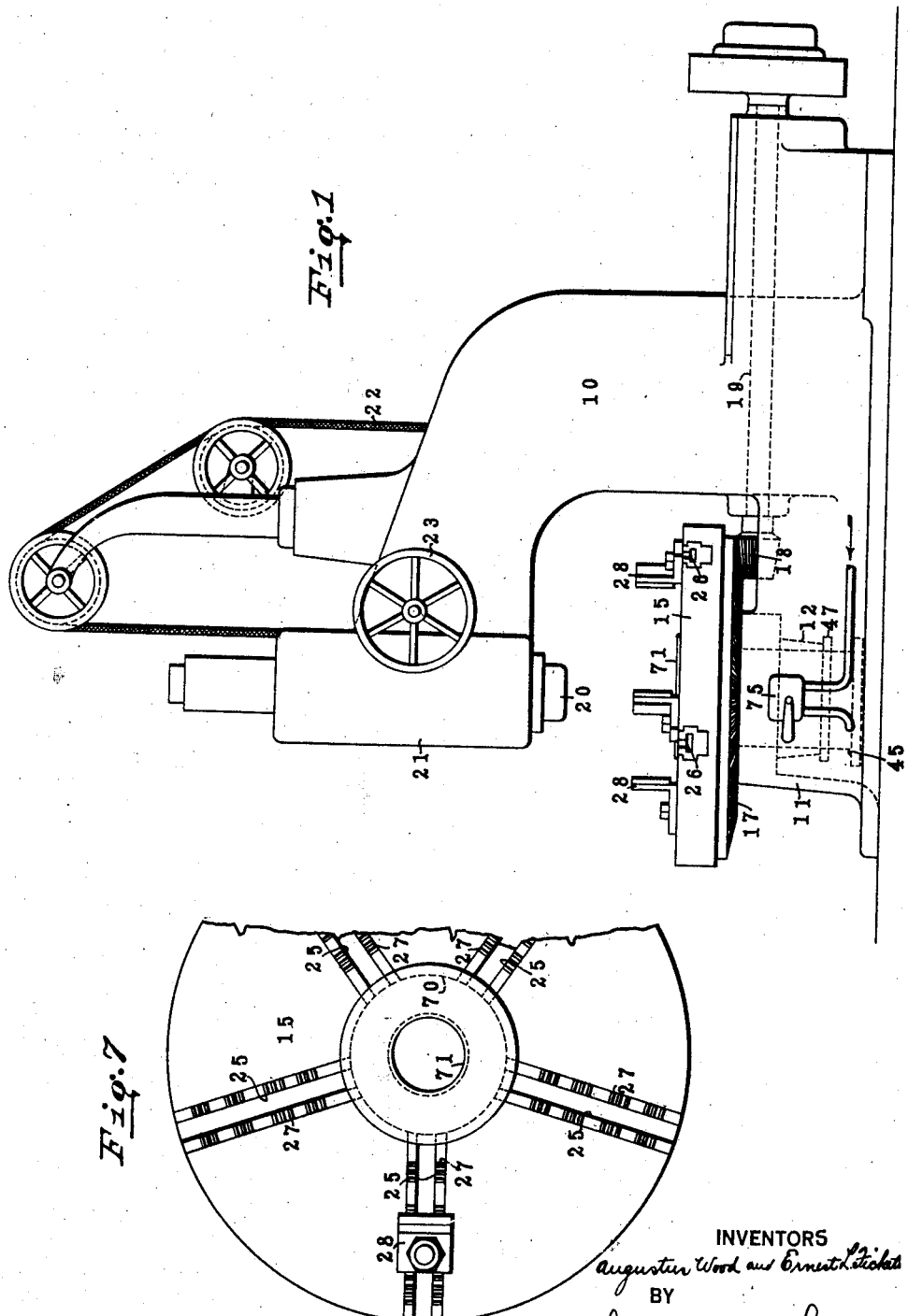
INVENTORS
Augustus Wood and Ernest L. Tickets
BY
Duell, Warfield & Duell.
ATTORNEY

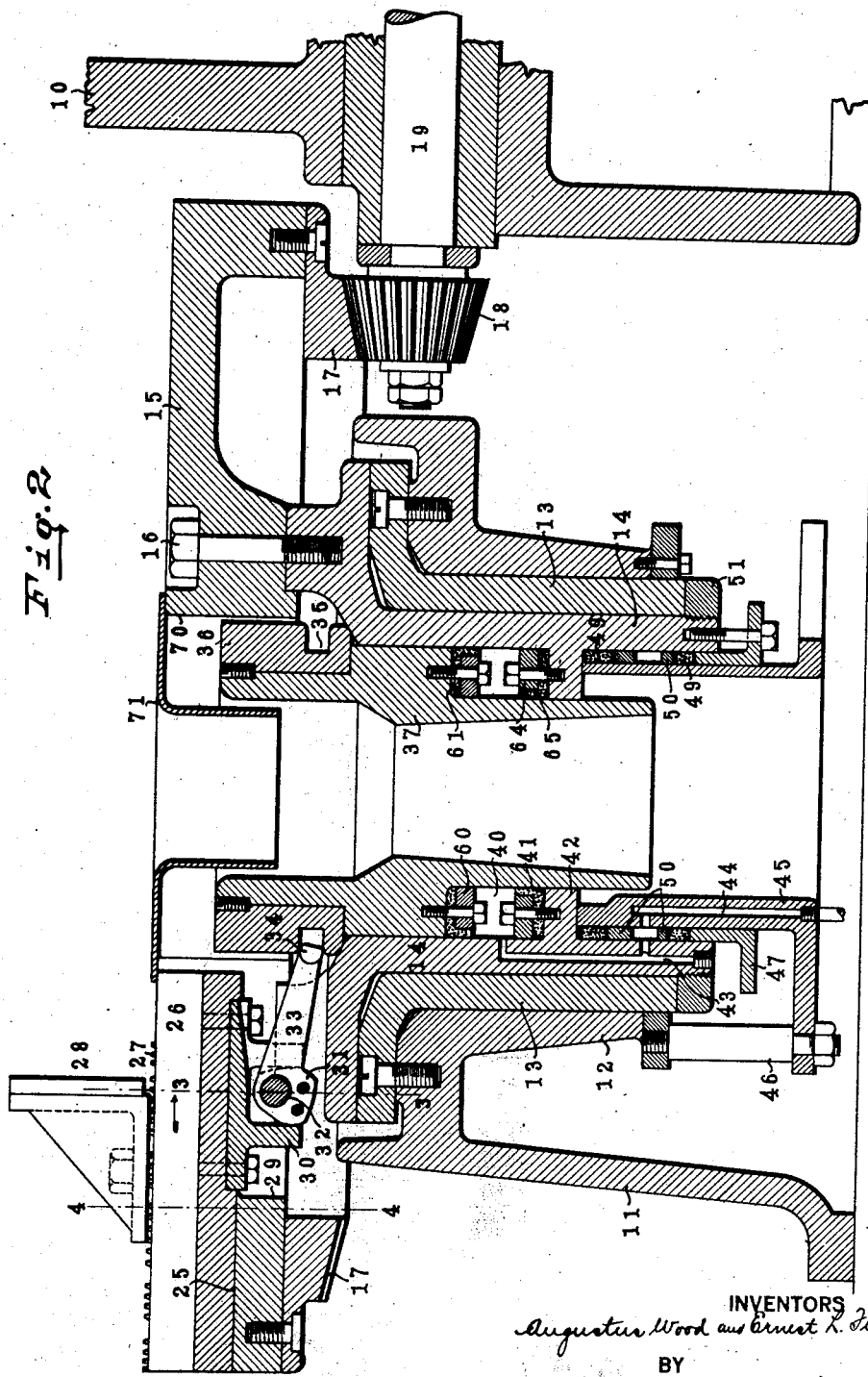

March 31, 1925. 1,531,327
A. WOOD ET AL
PNEUMATIC CHUCK FOR BORING MACHINES
Filed April 18, 1922    3 Sheets-Sheet 3
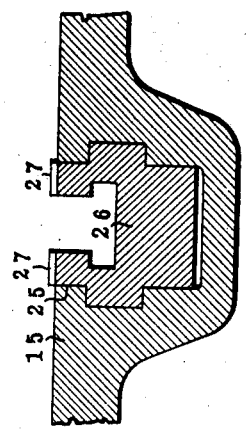
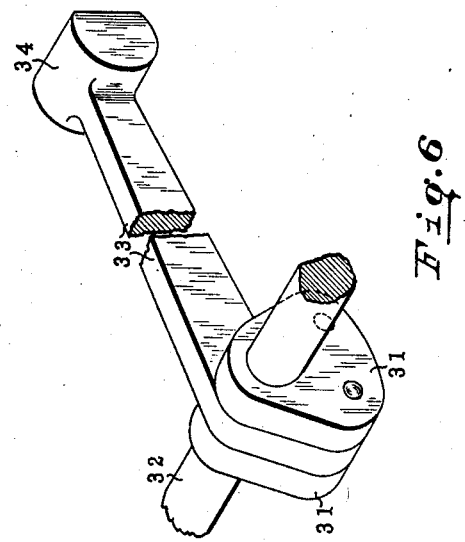
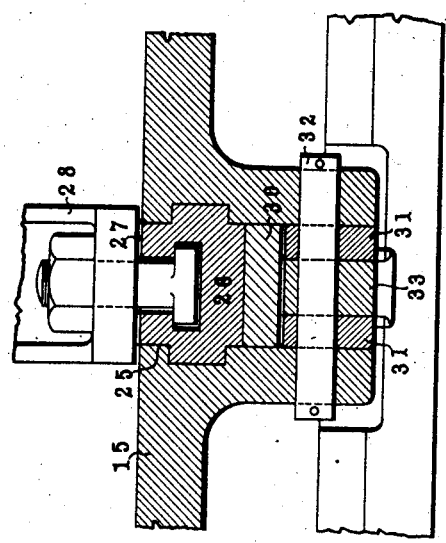
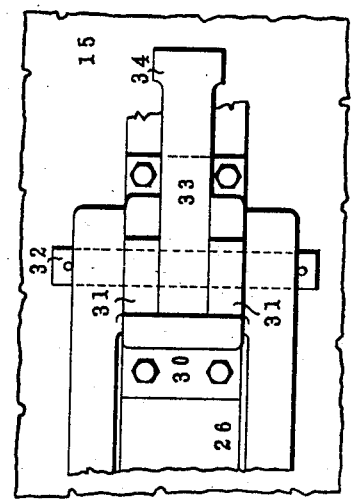
INVENTORS
Augustus Wood and Ernest L. Tickett
BY
Duell, Warfield & Duell
ATTORNEY Patented Mar. 31, 1925.

1,531,327

UNITED STATES PATENT OFFICE.

AUGUSTUS WOOD AND ERNEST L. FICKETT, OF FITCHBURG, MASSACHUSETTS, ASSIGNORS TO MANNING, MAXWELL & MOORE, INC., OF NEW YORK, N. Y., A CORPORATION OF NEW JERSEY.

PNEUMATIC CHUCK FOR BORING MACHINES.

Application filed April 18, 1922. Serial No. 554,874.

*To all whom it may concern:*

Be it known that we, AUGUSTUS WOOD and ERNEST L. FICKETT, citizens of the United States, residing at Fitchburg, in the county of Worcester and State of Massachusetts, have invented certain new and useful Improvements in Pneumatic Chucks for Boring Machines, of which the following is a full, clear, and exact description, such as will enable others skilled in the art to which it appertains to make and use the same.

This invention relates to machine tools and more particularly to vertical lathe and boring mill types of machine tools for boring car wheels.

This invention has for its general object an improved construction and arrangement of parts which is durable, efficient, and readily manufactured.

A more specific object of this invention is to provide a machine tool of the boring mill type which is adapted to be operated with greater facility and precision than previous machines of this type.

Another object is to provide machines of this type with improved means for automatically gripping and centering the article to be bored.

Still another object is to provide the rotating element or table of boring mills, which are adapted for boring car wheels and articles requiring like machining with improved chucking mechanism which is pneumatically operated independently of any starting or driving mechanism; and which is adapted automatically to center and grip the article for holding it in place. This chucking mechanism is preferably arranged to operate by gravity to release the article when the power is off.

Other objects and advantages will in part be specifically pointed out hereinafter and in part obvious from the arrangements and constructions here set forth.

The invention accordingly consists in the features of construction, combinations of elements and arrangement of parts which will be exemplified in the construction hereinafter set forth, and the scope of their application will appear in the appended claims.

For a more complete understanding of the nature and advantages of this invention reference should be had to the following detailed description, which describes the best illustrative embodiments of this invention at present known to us, taken in connection with the accompanying drawing in which:

Fig. 1 is a side elevation of a boring mill constructed in accordance with this invention;

Fig. 2 is a fragmentary vertical section showing the table or rotating element equipped with power operated chucking mechanism in accordance with this invention;

Figs. 3, 4, 5 and 6 show various details of this invention; and

Fig. 7 is a plan view of the table shown in Fig. 1, part being broken away.

Referring now to the drawing and particularly to Figs. 1 and 2, 10 denotes the boring mill frame which has a bed 11 provided with a vertical bearing at 12 (indicated in dotted lines in Fig. 1, but in full lines in Fig. 2). The vertical bearing 12 has a bushing member 13 in which turns the tubular journal 14 to which the rotating element or table 15 is secured, as shown in Fig. 2, by means of bolts 16. On the under side of the table 15 there is secured the annular bevel gear 17 which engages with the bevel pinion 18 on the driving shaft 19, which, as indicated by the dotted lines in Fig. 1, is suitably journaled in the frame 10.

The machine illustrated is provided with the boring bar 20 for supporting the boring tool or instrument. The boring bar 20 slides in the head 21 and has suitable counter-balancing mechanism as indicated at 22. A hand wheel for raising and lowering the boring bar is shown at 23.

The table 15, as indicated in Fig. 7, is provided with a plurality of radial guideways 25 in each of which reciprocates a slotted slide 26. These slotted slides are preferably provided with toothed formations on their upper faces as indicated at 27; these formations co-operate with the gripping devices 28, which are fitted and bolted thereto and are adapted to be drawn against and grip the car wheels or other articles on the table 15, holding them in place while being bored or otherwise machined.

The radial guideways 25 at their inner ends are cut away to form openings 29 through the table 15, which openings are adapted to receive the inverted U-members 30 that are secured on the bottom at the inner ends of each of the slotted slides. Each U-member has its legs engaged by cams 31 pivoted on a shaft 32, which is removably secured in the opening 29 in the table 15 below the path of the slotted slide. These cams 31 on the shaft 32 are made fast to and are operated by cam levers 33 and they are shown as eccentrics as far as their operative surfaces are concerned to control the motion of the slides so as to ease up on the motion and slow it down as the jaws grip the work. These cam levers, as indicated clearly in Fig. 2, have their free ends projecting inwardly toward the vertical axis about which the table 15 revolves, and are terminated a predetermined distance from the vertical axis, preferably with a thickened portion 34 which is adapted to ride in an annular groove 35 shown formed in the collar 36; which latter is secured on the upper end of the cylindrical plunger 37.

The plunger 37 in accordance with the practice of this invention is power-actuated independently of any starting or driving mechanism, and is arranged in coaxial relation with the vertical axis about which the table 15 turns, and is preferably so mounted that it rotates with and is carried by the tubular journal 14. The collar 36, in the arrangement illustrated is so formed that it provides a stop to limit the plunger 37 in its downward movement. As seen, the lowermost edge of the collar 36 meets and bears on the upwardly flaring portion of the tubular journal when the plunger 37 has descended to its lowermost position.

The arrangement for the power-actuation of the plunger 37 as illustrated in Fig. 2, employs a fluid under pressure which is admitted to the annular pressure chamber 40 obtaining between the reduced lower end 41 of the plunger 37 and the annular rib 42 projected out from the interior of the wall of the tubular journal 14. Any suitable fluid under pressure, such as water, compressed air, and the like, may be admitted to the chamber 40 for this purpose; a vertically extending passage 43 being formed in the wall of the tubular journal 14 to convey the fluid thence. This passage 43 communicates directly at its upper end with the chamber 40, while at its lower end it communicates with an inlet passage 44 formed in the wall of the flanged member or packing gland 45, which flanged member extends upwardly within the open lower end of the tubular journal 14 and is held in such position by means of distance pieces 46 bolted to the lower end of the bearing 12. Between the flange member 45 and the tubular journal 14 there is a second or packing flange 47 which is secured to the tubular journal 14 and rotates with it, turning about the flange member 45. This packing flange is adapted to force the packing rings 49 and the perforated ring 50 snugly up between the flange member 45 and the rotating tubular journal 14. The perforated ring 50 provides communication at all times between the passage 44 in the flange member 45 and the passage 43 in the tubular journal 14 whatever the relative positions of the tubular journal and member 45. The tubular journal 14 is provided at its lower end with an annular nut 51 which bears against the lower end of the bushing member 13 and prevents the accidental displacement of the tubular journal in the bearing.

An annular ring 60 embraces the reduced portion 41 of the plunger 37 and secures a packing ring 61 to the plunger 37 against the reducing shoulder, which packing ring has an overhanging portion adapted to engage with the interior wall of the tubular journal 14 so as to prevent the escape of fluid upwardly between the plunger and the tubular journal. In like manner an annular ring 64 is secured to the annular rib 42 of the tubular journal in order to secure a packing ring 65 therebetween, which ring likewise has an overhanging portion bearing against the tubular wall of the reduced portion of the plunger 37 in order similarly to prevent fluid under pressure from escaping downwardly from the chamber 40 into the space in the base of the machine.

In order to remove the plunger for the purpose of replacing, making repairs to, or inspecting the packing rings 61 and 65, there are provided vertical notches (not shown) in the periphery of collar 36 spaced at distances corresponding to cam levers 33. Upon rotation of the collar and attached plunger to a point at which cam levers 33 register with these notches, the plunger may be withdrawn through the opening 70 in table 15. In order that chips or other particles coming from the article being machined shall not be likely to work down about the plunger 37, or interfere with the power-actuating mechanism for the slides 26, a tubular flange or apron 71 is provided which reduces the size of the opening 70 and guides chips or other particles into the opening through the plunger 37, thereby enabling them to be withdrawn conveniently from the bottom of the machine. When it is desired to remove the plunger for repairs, the apron 71 is removed, the plunger forced up by air pressure as far as it will go and then it is lifted up through the opening 10 by a crane or the like. The opposite procedure is employed in assembling.

The control of the admission and escape of fluid under pressure for the chamber 40 is effected from a convenient point on the machine by the manually manipulated valved means shown at 75 in Fig. 1, which means is preferably a three-way type of valve and admits and exhausts fluid from the chamber 40, where the fluid acts upwardly on the moving piston surface of the plunger 37 thereby accomplishing a gravity return of the plunger when fluid is being exhausted from this chamber.

In operation, the gripping devices 28 are suitably set upon slotted slides 26 when a car wheel or similar article to be bored or machined is placed more or less centrally upon the table 15; a small crane being usually employed for this purpose. (This more or less central location of the article on the table is merely incidental to the ordinary release of the article from such crane.) The valve 75 is then manipulated to admit fluid under pressure to the chamber 40 whereupon the plunger 37 moves upwardly; such upward movement of the plunger simultaneously moves the inner ends of the cam levers 33 upwardly. The cams 32 thus moved by the levers 33 bear upon the innermost legs of the U-members 30 and move the slotted slides 26 inwardly simultaneously. The car wheel, or other article on the table 15 is thus automatically gripped and centered by the gripping devices 28, and as a result is rigidly held (although somewhat elastically held on account of the power-communicating means being a fluid) in place during the machining operation. When the valve 75 is manipulated to release the fluid under pressure the plunger 37 moves downwardly by its own weight under the influence of gravity and actuates the levers 33 simultaneously to release the car wheel or other article machined.

As many changes could be made in the above construction and many apparently widely different embodiments of this invention could be made without departing from the scope thereof, it is intended that all matter contained in the above description or shown in the accompanying drawings shall be interpreted as illustrative and not in a limiting sense.

It is also to be understood that the language used in the following claims is intended to cover all of the generic and specific features of the invention herein described and all statements of the scope of the invention, which, as a matter of language, might be said to fall therebetween.

Having described our invention, what we claim as new and desire to secure by Letters Patent is:

1. In a car wheel boring machine, the combination with a table for supporting a car wheel on its upper surface in horizontal position, and a tubular journal secured thereto centrally and depending therefrom and having a horizontal top annular flange, of a bed having a vertical bushing member in which said journal is rotatably located, the journal having a top flange resting by gravity on the top flange of said bushing member for supporting the journal, a plunger movable vertically in said tubular journal, wheel gripping devices movable radially on said table means connected with and operated by said plunger for moving the gripping devices, and pneumatic means for raising the plunger and moving the gripping devices inwardly to clamp the work by pneumatic pressure.

2. In a boring machine, the combination with a table rotatable on a vertical axis for supporting the work, of work gripping means horizontally movable on the table, a hollow plunger located in vertical position below the center of the table, means for moving the gripping means inwardly when the plunger is raised, means for raising the plunger, and a tubular flanged member the tubular portion of which is smaller than the interior opening in the plunger resting on the table and depending through the center thereof for guiding chips and the like into the center of the opening in the plunger.

3. In a car wheel boring machine, the combination with a table for supporting a car wheel in horizontal position, and a tubular journal secured thereto centrally and depending therefrom, of a bed having a vertical bushing member in which said journal is rotatably located, a plunger vertically movable in said journal, means for raising the plunger, and means operated by the plunger for gripping the work on the table, the table having a central opening above the plunger larger than the largest diameter of the plunger, whereby the plunger can be raised by power into said opening and can be withdrawn therethrough.

4. In a boring machine, the combination with a table for supporting a car wheel in horizontal position, and a tubular journal secured thereto and depending therefrom, of a bed having a vertical bushing member in which said journal is rotatably located, a plunger movable vertically in said tubular journal, gripping devices movable radially on said table, means connected with and operated by said plunger for operating said gripping devices, and a packing gland closing the bottom of said tubular journal and having an inlet therethrough for compressed air, the journal having a passage therein for conducting the air from the inlet, and the plunger and journal having an air space between them constantly in communication with said passage, whereby air can be introduced to lift the plunger.

5. In a machine tool, the combination with a table adapted to rotate and support an article to be machined, of a plurality of slides in said table provided with gripping devices for holding the articles to be machined, means for driving said table, a tubular journal adapted to rotate disposed beneath and supporting said table, a plunger adapted to reciprocate within said journal, said journal and plunger being formed to provide a fluid chamber between their walls surrounding the plunger to which fluid under pressure may be admitted or discharged for moving said plunger, and mechanical connections between said plunger and each of said slides whereby movement of said plunger simultaneously actuates the gripping devices.

6. In a boring mill, the combination with a machine frame having a vertical bearing, of a tubular journal adapted to turn in said bearing, a table having a plurality of radial guideways secured upon said journal, slides in said guideways adapted to support gripping devices for holding an article to be machined on said table, power means for driving said table, levers for reciprocating said slides disposed on the underside of said table, having their free ends converging toward the journal, a plunger having its upper end engaging with the free ends of said levers and its lower end reduced, the whole being arranged to reciprocate within the tubular journal, said journal having an inwardly projecting annular rib co-operating with said reduced lower end to form a pressure chamber, the wall of said journal having a passageway adapted to convey fluid for said chamber, and an external valved means adapted to control the supply of fluid.

7. In a boring machine, the combination with a table for supporting a car wheel and a tubular journal secured thereto and extending therefrom, of a bed having a bushing member in which said journal is rotatably located, a plunger movable in said tubular journal, gripping devices movable radially on said table, means connected with and operated by said plunger for operating said gripping devices, and a packing gland closing the end of said tubular journal and having an inlet therethrough for compressed air, the journal having a passage therein for conducting the air from the inlet, and the plunger and journal having an air space between them constantly in communication with said passage, whereby air can be introduced to operate the plunger.

8. In a car wheel boring machine, the combination with a table for supporting a car wheel and a tubular journal secured thereto centrally and extending rearwardly therefrom, of a bed having a bushing member in which said journal is rotatably located, a plunger movable in said journal, means for moving the plunger, and means operated by the plunger for gripping the work on the table, the table having a central opening beyond the plunger larger than the largest diameter of the plunger, whereby the plunger can be moved by power into said opening and can be withdrawn therethrough.

In testimony whereof we affix our signatures, in the presence of two witnesses.

AUGUSTUS WOOD.
ERNEST L. FICKETT.

Witnesses:
MARMADUKE M. WILLS,
JOHN J. CONROY.